United States Patent
Arnold et al.

(10) Patent No.: US 8,798,881 B2
(45) Date of Patent: Aug. 5, 2014

(54) METHOD FOR OPERATING A TRANSMISSION DEVICE WITH A PLURALITY OF FRICTION-LOCKING AND POSITIVE-LOCKING SHIFTING ELEMENTS

(75) Inventors: Jorg Arnold, Immenstaad (DE); Valentine Herbeth, Friedrichshafen (DE); Georg Mihatsch, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 510 days.

(21) Appl. No.: 13/260,593

(22) PCT Filed: Mar. 31, 2010

(86) PCT No.: PCT/EP2010/054313
§ 371 (c)(1),
(2), (4) Date: Sep. 27, 2011

(87) PCT Pub. No.: WO2010/115808
PCT Pub. Date: Oct. 14, 2010

(65) Prior Publication Data
US 2012/0029778 A1    Feb. 2, 2012

(30) Foreign Application Priority Data

Apr. 6, 2009    (DE) .................. 10 2009 002 203

(51) Int. Cl.
*F16H 3/66* (2006.01)
*F16H 61/08* (2006.01)
*F16H 61/686* (2006.01)
*F16H 3/44* (2006.01)
*F16H 61/04* (2006.01)
*F16H 59/42* (2006.01)

(52) U.S. Cl.
CPC .......... *F16H 3/666* (2013.01); *F16H 2003/442* (2013.01); *F16H 2061/0474* (2013.01); *F16H 61/0403* (2013.01); *F16H 2200/2064* (2013.01); *F16H 2200/2046* (2013.01); *F16H 2200/2012* (2013.01); *F16H 61/08* (2013.01); *F16H 2200/0065* (2013.01); *F16H 61/0437* (2013.01); *F16H 2059/425* (2013.01); *F16H 61/686* (2013.01)
USPC .......................................................... 701/61

(58) Field of Classification Search
USPC .......................................................... 701/61
See application file for complete search history.

(56) References Cited

U.S. PATENT DOCUMENTS 3,757,606 A * 9/1973 Forster et al. ................... 475/69
4,485,443 A * 11/1984 Knodler et al. ................. 701/60

(Continued)

FOREIGN PATENT DOCUMENTS

DE    197 56 637 A1    6/1999
DE    199 23 090 A1    11/2000

(Continued)

*Primary Examiner* — Ian Jen
(74) *Attorney, Agent, or Firm* — Davis & Bujold, PLLC; Michael J. Bujold

(57) ABSTRACT

A method of operating a transmission device comprising friction-locking and form-locking shift elements for obtaining different gear ratios. A shift request for engaging a shift element undergoes a time delay dependent upon an operating state prior to a time of engagement of the shift element. A rotational speed differential between halves of the shift element lies within a rotational speed differential window required for the engagement procedure is assigned to the time of engagement. A gradient of the transmission input speed is ascertained at the time of the shift request, and the actual gradient is subsequently monitored and compared with the gradient that existed at the time of the shift request. If an absolute deviation greater than a threshold value is ascertained, the time delay is changed or an actuation of another shift element to be disengaged is varied such that the deviation is reduced below the threshold value.

10 Claims, 2 Drawing Sheets

(56) References Cited

U.S. PATENT DOCUMENTS

| | | | |
|---|---|---|---|
| 5,938,563 A | 8/1999 | Nishio et al. | |
| 6,301,984 B1 | 10/2001 | Petzold | |
| 6,409,630 B1 | 6/2002 | Yu | |
| 6,699,156 B2 | 3/2004 | Steinhauser et al. | |
| 6,896,641 B2 | 5/2005 | Matsumura et al. | |
| 6,962,549 B2 | 11/2005 | Dreibholz et al. | |
| 7,682,281 B2 | 3/2010 | Ziemer | |
| 7,780,570 B2 | 8/2010 | Iwatsuki et al. | |
| 2004/0009843 A1* | 1/2004 | Habeck | 477/143 |
| 2008/0066567 A1 | 3/2008 | Kobayashi et al. | |

FOREIGN PATENT DOCUMENTS

| | | |
|---|---|---|
| DE | 100 44 459 A1 | 5/2001 |
| DE | 100 56 578 A1 | 5/2002 |
| DE | 100 58 043 A1 | 5/2002 |
| DE | 102 44 023 A1 | 4/2004 |
| DE | 10 2004 014 081 A1 | 10/2005 |
| DE | 10 2007 059 472 A1 | 6/2008 |
| EP | 1 344 965 A2 | 9/2003 |

* cited by examiner

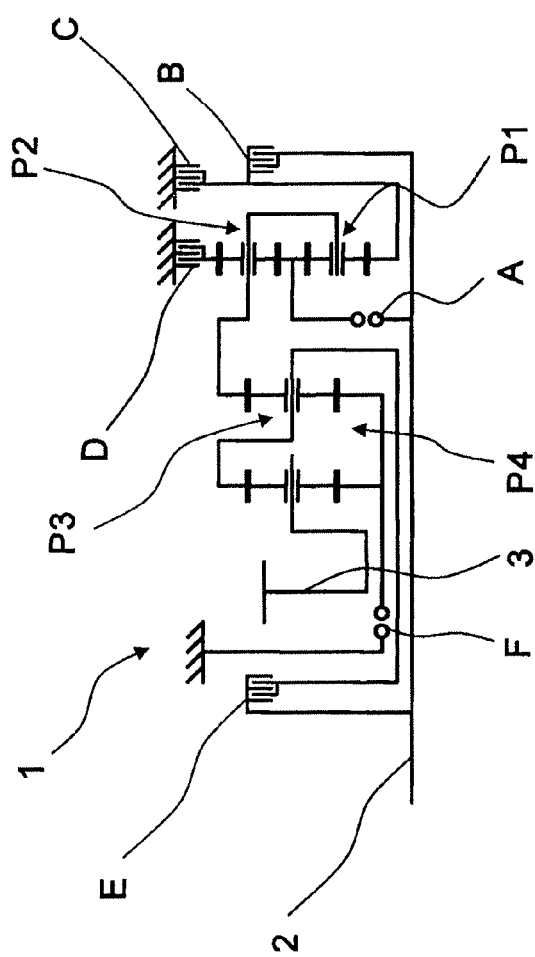

METHOD FOR OPERATING A TRANSMISSION DEVICE WITH A PLURALITY OF FRICTION-LOCKING AND POSITIVE-LOCKING SHIFTING ELEMENTS

This application is a National Stage completion of PCT/EP2010/054313 filed Mar. 31, 2010, which claims priority from German patent application serial no. 10 2009 002 203.1 filed Apr. 6, 2009.

FIELD OF THE INVENTION

The invention relates to a method for operating a transmission device comprising a plurality of friction-locking and form-locking shift elements.

BACKGROUND OF THE INVENTION

In automatic transmissions known from practical applications, which comprise friction-locking shift elements and form-locking shift elements for obtaining different gear ratios, the shift command for engaging a form-locking connection by applying force is triggered by a transmission control or transmission software implemented in the transmission control with a certain time delay before the synchronization point of the form-locking shift element is reached.

The time delay is influenced to a considerable extent by the operating temperature of the transmission oil, inter alia, in particular when the form-locking shift elements of automatic transmissions are hydraulically actuated.

The time delay that is required, in a particular case depending on the operating state, or the time period between the time of the shift request and the engagement time of the form-locking shift element, is preferably determined empirically and, during operation of an automatic transmission, is determined as a function of the gradient of a transmission input speed or an equivalent rotational speed parameter.

This approach should ensure that events which delay implementation of the shift command such as signal transit times, hydraulic delays, covering the distance to engage the form-locking connection, and the like, are taken into account to the extent that a rotational speed differential between the halves of the shift elements of the form-locking shift element to be engaged lies within a predefined rotational speed differential window at the engagement time, wherein all of the rotational speed differentials encompassed by the rotational speed differential window represent a precondition for comfortable engagement of the form-locking shift element.

Document DE 197 56 637 A1 makes known a shift device for connecting components of a transmission rotating at different speeds and at least one shift group, wherein the shift device is actuated by a control fluid. A unit containing valves, shift cylinder pistons, and shift elements is provided for each shift group of the transmission. Pulse-operated 2/2 directional control valves are used as the triggering valves. A position-measuring system is used to determine the actual position of the piston relative to the shift cylinder of a shift element. When gears are meshed to form a torque-transferring connection, the shift force and shifting time are adjusted in order to attain variable synchronization times and faster shifting times.

The above-described transmission devices have the problem, however, in that spontaneous changes in the gradient of the transmission input speed or the equivalent rotational speed parameter that results, for example, from a great change in the gas pedal position of a vehicle or strong braking of the vehicle by the driver cannot be taken into account to a desired extent after the time of the shift request to engage a form-locking shift element.

This is due to the fact that the gradient that exists at the time of the shift request no longer corresponds to the actual gradient, and the engagement time of the form-locking shift element determined at the time of the shift request across the selected time period no longer coincides with the point of time at which the rotational speed differential of the form-locking shift element lies within the rotational speed differential window required for comfortable engagement of the form-locking shift element. If the form-locking shift element is then engaged outside of the desired rotational speed differential window, shifting noises are produced that affect driving comfort, and torque reactions occur in the drive train, which can be perceived by a driver in the form of jerks.

DE 102 44 023 A1 shows such a method for operating a transmission device comprising a plurality of fiction-locking and form-locking shift elements for obtaining different gear ratios.

SUMMARY OF THE INVENTION

The problem addressed by the present invention is therefore that of providing a method for operating a transmission device comprising a plurality of friction-locking and form-locking shift elements for obtaining different gear ratios, with which shifting that involves at least one form-locking shift element and affect driver comfort are easily prevented.

In the method for operating a transmission device comprising a plurality of friction-locking and form-locking shift elements for obtaining different gear ratios, a shift request to engage a form-locking shift element undergoes a time delay dependent upon an operating state prior to an engagement time of the form-locking shift element. At the engagement time, a rotational speed differential between the halves of the shift elements of the form-locking shift element lies within a rotational speed differential window required for the engagement procedure.

According to the invention, a gradient of the transmission input speed or an equivalent rotational speed parameter is ascertained at the time of the shift request, and the actual gradient is subsequently monitored and compared with the gradient that existed at the time of the shift request, wherein, if an absolute deviation greater than a threshold value is ascertained, the period of time is changed.

This means that, given a predefined deviation between the gradient at the shift request time and an actual gradient of the transmission input speed or the equivalent rotational speed parameter, action is taken to remain within the time period—which was calculated in advance or selected depending on the operating state—between the generation of the shift request and the engagement time of the form-locking shift element or the engagement of the form-locking shift element by correcting the gradient, or to vary the engagement speed of the form-locking shift element, and to be able to easily engage the form-locking shift element with a high level of shifting comfort at a rotational speed differential that lies within the rotational speed differential window.

Given a positive deviation between the actual gradient and the gradient that existed at the time of the shift request for a downshift, the time period is shortened in an advantageous variant of the method according to the invention, wherein the rotational speed differential between the halves of the shift elements of the form-locking shift element that is present after expiration of the shortened time period lies at least approximately within the rotational speed differential window. It is thereby easily ensured that the requested shifting can be carried out with a high level of comfort.

Given a negative deviation between the actual gradient and the gradient that existed at the time of the shift request for a downshift, the time period is extended in a variant of the method according to the invention, wherein the rotational speed differential between the halves of the shift elements of the form-locking shift element that is present after expiration of the extended time period lies at least approximately within the rotational speed differential window, and shifting with a high level of comfort is ensured.

The time period between the time of the shift request for a downshift and the engagement time of the form-locking shift element can be adjusted in a manner dependent upon the operating state by varying the actuating force of the form-locking shift element, in order to perform shifting with a high level of comfort.

If the intention according to the request is to shorten the time period, the actuating force of the form-locking shift element is easily increased, in one variant of the method according to the invention.

If the intention is to extend the time period to ensure that shifting is carried out with a high level of comfort, the actuating force of the form-locking shift element is reduced, in a further variant of the method.

The actuating force is varied by changing the control current when the form-locking shift element is actuated electrically, while the actuating force can be varied by changing the actuating pressure when the form-locking shift element is actuated pneumatically or hydraulically.

Alternatively, it is also possible to vary the actuating force by applying a counter-pressure that counteracts the actuating pressure when the form-locking shift element is actuated hydraulically.

BRIEF DESCRIPTION OF THE DRAWINGS

Further advantages and advantageous developments of the invention will become apparent from the claims and the embodiments, the principle of which is described with reference to the drawing; for the sake of clarity, the same reference characters are used for components having the same design and function in the description of the embodiments.

They show:

FIG. 1 a gearwheel pattern of a transmission device comprising a plurality of friction-locking and form-locking shift elements for obtaining different gear ratios;

FIG. 2 a shift pattern of the transmission device according to FIG. 1; and

DETAILED DESCRIPTION OF THE PREFERRED EMBODIMENTS

Figure 3:
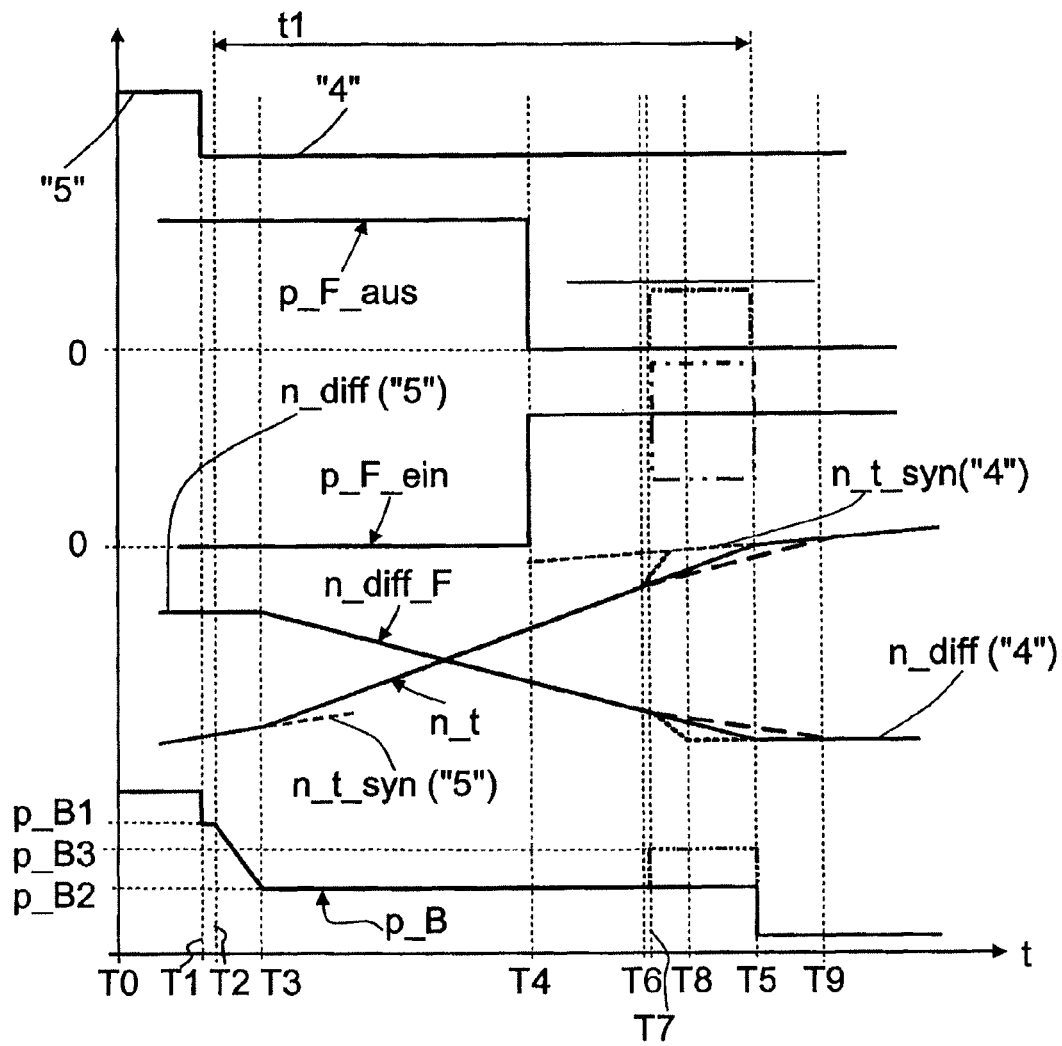
FIG. 3 a plurality of alternative graphs of various operating state parameters of the transmission device according to FIG. 1 during a downshift.

FIG. 1 shows a gearwheel pattern of a transmission device 1 or a multi-stage transmission, which is basically known from the unpublished German patent application DE 10 2008 000 429.4 which belongs to the applicant. The transmission device 1 comprises a drive shaft 2 and an output shaft 3 which, in the installed state in a vehicle, is connected to an output drive of the vehicle, while the drive shaft 2 is operatively connected to a drive motor.

The transmission device 1 also comprises four planetary gear sets P1 to P4, wherein the first and second planetary gear sets P1, P2, which are preferably in the form of minus planetary gear sets, form a shiftable, input-side gear set, while the third and fourth planetary gear sets P3, P4 are the main gear set. The transmission device 1 also comprises six shift elements A to F, of which shift elements C, D and F are designed as brakes, and the shift elements A, B and E are designed as shifting clutches.

Using the shift elements A to F, selective shifting of nine forward gears "1" to "9" and one reverse gear "R" can be attained using the shift logic presented in greater detail in FIG. 2; to obtain a gear ratio in the transmission device 1 or to establish power flow in the transmission device 1, three shift elements must be moved into an engaged operating state or held there simultaneously in every case except for the fourth transmission ratio step "4".

The shift elements A and F are designed as form-locking shift elements in the present case, to reduce drag torques produced by disengaged, friction-locking shift elements during operation of the transmission device 1 as compared to transmission devices comprising only friction-locking shift elements. Since form-locking shift elements can be transferred from a disengaged operating state to an engaged operating state with a desired level of comfort in general only within a very narrow rotational speed differential band or rotational speed differential window encompassing the synchronous rotational speed, the synchronization of a form-locking shift element to be engaged is supported and ensured without additional structural embodiments due to the method according to the invention, which is described in greater detail in the following.

The variants of the method according to the invention described below are advantageous in the case of downshifts in particular, in which a friction-locking shift element is disengaged and a form-locking shift element is engaged in the powerflow of the transmission device 1, wherein the form-locking shift elements A and F of the transmission device 1 under consideration can be in the form of claw clutches designed with or without additional synchronization.

The mode of operation of different variants of the method according to the invention is explained in greater detail in the following with reference to the graphs of a plurality of operating state parameters of the transmission device 1 according to FIG. 1, which are plotted as a function of time t in FIG. 3.

In the courses of operating states which form the basis for the graphs of the operating state parameters of the transmission device 1 presented in FIG. 3, the fifth transmission ratio step "5" is engaged in the transmission device 1 in every case at a point of time T0. To obtain the fifth transmission ratio step "5", the shift elements A, B and E are held in the engaged state, while the shift elements C, D and F are disengaged.

At a point of time T1, a shift request is generated for a downshift from the fifth transmission ratio step "5" to the fourth transmission ratio step "4", which is why a shift course SV abruptly drops from the level of the fifth transmission ratio step "5" to the level of the fourth transmission ratio step "4".

To carry out the requested downshift from the fifth transmission ratio step "5" to the fourth transmission ratio step "4", the friction-locking shift element B must be disengaged or disengaged from the power flow of the transmission device 1, and the form-locking shift element F must be engaged in the power flow of the transmission device 1 or transferred from the disengaged operating state to the engaged operating state thereof. The friction-locking shift element B is therefore acted upon up to point of time T1 with an actuating pressure p_B that corresponds to the engagement pressure value at which the shift element B is fully engaged, while the form-locking shift element F is acted upon with a pressure value of the actuating pressure $p\_F\_ein$ that is substantially equal to 0.

At point of time T1, a transmission input speed or an equivalent turbine rotational speed $n\_t$ corresponds to a synchronous rotational speed $n\_t\_syn("5")$ of the fifth transmission ratio step "5", thereby resulting in a rotational speed differential $n\_diff\_F$ at the rotational speed level $n\_diff\_F("5")$ in the region between the halves of the shift elements of the form-locking shift element F.

At point of time T1, at which the shift request for the downshift from the fifth transmission ratio step "5" to the fourth transmission ratio step "4" takes place, the actuating pressure $p\_B$ drops abruptly from the engagement pressure level to a first intermediate pressure value $p\_B1$ and remains substantially at this pressure level until point of time T2. Next, the actuating pressure $p\_B$ of the friction-locking shift element B is reduced to a second intermediate pressure value at which the shift element B transitions into a slip mode.

Reducing the transmission capability of the friction-locking shift element B causes the turbine rotational speed $n\_t$ to increase in the direction of the synchronous rotational speed $n\_t\_syn("4")$ of the fourth transmission ratio step "4" at the point of time T3 at which the shift element B is acted upon with the second intermediate pressure value $p\_B2$, starting at the rotational speed level of the synchronous rotational speed $n\_t\_syn("5")$ of the turbine rotational speed $n\_t$. In turn, this causes the rotational speed differential $n\_diff\_F$ of the form-locking shift element F to decrease, starting at point of time T3, in the direction of the synchronous rotational speed $n\_diff\_F("4")$ which is equal to 0. At a point of time T4, the actuating pressure $p\_F\_ein$ of the form-locking shift element F is raised to an engagement pressure level and is left at this pressure level.

The gradient of the turbine rotational speed $n\_t$ is determined at the point of time T1. At the same time, monitoring of the actual gradient of the turbine rotational speed $n\_t$ is started and is permanently compared to the gradient at shift request time T1. If an absolute deviation greater than a threshold value is determined, one of the actions described below is taken to change a time period t1 determined depending on the operating state at the shift request time T1 in a manner that ensures a high level of shifting comfort, or to decrease a deviation between the gradient of the turbine rotational speed $n\_t$ at the shift request time T1 and an actual operating time below the predefined threshold value.

The time period t1 extends between the engagement time T1 and a shifting time T5 of the form-locking shift element F determined depending on the operating state at time T1 as a function of the gradient of the turbine rotational speed $n\_t$ and occurrence of events that delay the shift request, such as a signal transit time, hydraulic delays, covering the distance to engage the form-locking shift element, and the like, wherein the point of time T5 varies greatly depending on the temperature of the transmission oil given the form-locking shift element F which is actuated hydraulically in the present case. The time period t1 is determined via computation using a model of the transmission device 1, or is read from an empirically determined characteristic map.

In a first variant of the operating state course which is used as the basis for the graphs of the operating state parameters of the transmission device 1 according to FIG. 1, the turbine rotational speed $n\_t$ increases at a point of time T6 due, for example, to a spontaneous change in actuation of the gas pedal by the driver, with a steeper gradient in the direction of the synchronous rotational speed $n\_t\_syn("4")$ than at point of time T1. At a point of time T7, the deviation between the gradient at the shift request time T1 and the actual gradient of the turbine rotational speed $n\_t$ is greater than the predefined threshold value. The engagement speed of the form-locking shift element F is increased temporarily by raising the actuating pressure $p\_F\_ein$ starting at the point of time T7 along the single-dot-dash line, and the shift element is engaged at a point of time T8 which occurs prior to the predefined engagement time T5 of the form-locking shift element F. The rotational speed differential $n\_diff\_F$ of the form-locking shift element at the point of time T8 corresponds at least approximately to the synchronous rotational speed $n\_diff\_F("4")$ which lies within the predefined rotational speed differential window, within which the requested shifting can be carried out with high shifting quality.

Alternatively, in a further variant of the method according to the invention, at the point of time T7 at which a positive deviation between the actual gradient and the gradient of the turbine rotational speed $n\_t$ determined at the shift request time T1 exists, the transmission capability of the friction-locking shift element B to be disengaged is raised temporarily along the four-dot-dash line from the second intermediate pressure value $p\_B2$ to a higher, third intermediate pressure value $p\_B3$. As a result, the actual gradient of the turbine rotational speed $n\_t$ is reduced, and the rotational speed differential $n\_diff\_F$ of the form-locking shift element F reaches the synchronous rotational speed $n\_diff\_F("4")$ at the shifting time T5 determined at shift request time T1, wherein the actuating pressure $p\_B$ is reduced to substantially 0 at the point of time T5 at which the downshift has been completed.

If, at the point of time T6, a negative deviation is determined between the actual gradient of the turbine rotational speed $n\_t$ and the gradient of the turbine rotational speed $n\_t$ determined at the shift request time T1, which is triggered, for example, by actuation of the vehicle brake by the driver while friction-locking shift element B is partially engaged, or because the driver spontaneously lifts his foot off of the gas pedal, an engagement speed of the form-locking shift element F is reduced between the points in time T7 and T5 by temporarily lowering the actuating pressure $p\_F\_ein$ of the form-locking shift element F, which is depicted graphically in FIG. 3 by the two-dot-dash line, and the form-locking shift element F is not engaged until a point of time T9 at which the turbine rotational speed $n\_t$ has reached the synchronous rotational speed $n\_t\_syn("4")$ of the fourth transmission ratio step "4". As a result, the time period t1 determined at the shift request time T1 is adapted or extended in a manner dependent upon the operating state by varying the actuating force of the form-locking shift element F, in order to carry out the requested shifting with the desired shifting quality which preferably remains consistently high.

If the form-locking shift element F is designed with a so-called dual-acting piston which can be acted upon in the region of a first effective area with the actuating pressure $p\_F\_ein$ in the closing direction of the form-locking shift element F, and in the region of a second effective area with a counter-pressure $p\_F\_aus$ that acts in the opening direction of the form-locking shift element F, the actuating force of the form-locking shift element F is reduced in the closing direction by temporarily increasing the counter-pressure $p\_F\_aus$ of the form-locking shift element F along the three-dot-dash line between the points in time T7 and T5, and the form-locking shift element F is fully engaged at the point of time T9 to the same extent as in the above-described temporary reduction of the actuating pressure $p\_F\_ein$ of the form-locking shift element F.

In the variant of the method according to the invention that was just described, the form-locking shift element is acted upon with the counter-pressure $p\_F\_aus$ between the points in time T0 and T4 at the disengagement pressure level of the form-locking shift element F, while the actuating pressure p_F_ein which acts in the engagement direction is substantially equal to 0. At the point of time T4 the counter-pressure p_F_aus is reduced from the disengagement pressure level to substantially 0, while the actuating pressure p_F_ein of the form-locking shift element F is raised from 0 abruptly to the engagement pressure level of the form-locking shift element F.

Between the points in time T7 and T5, the actuating pressure p_F_ein of the form-locking shift element F is left at the engagement pressure level, while the counter-pressure p_F_aus of the form-locking shift element is raised in this time window to an intermediate pressure level, as indicated by the three-dot-dash line, and is lowered back to 0 at the point of time T5 in order to extend the time period t1 to the extent described above to the point of time T9, and to be able to carry out the requested downshift with high shifting quality.

The graphs of the operating state parameters of the transmission device 1 shown using solid lines in FIG. 3 represent the course of the operating state of the transmission device 1 that occurs when a downshift is requested from the fifth transmission ratio step "5" to the fourth transmission ratio step "4" and it is determined that an absolute deviation between the actual gradient of the turbine rotational speed n_t and the gradient of the turbine rotational speed n_t determined at shift request time T1 is not greater than the predefined threshold value. The dash-dotted plots of the operating parameters p_F_ein, p_F_aus and p_B occur when the above-described variants of the method according to the invention are implemented if it is determined that an absolute deviation exists between the actual gradient of the turbine rotational speed n_t and the gradient of the turbine rotational speed n_t determined at the shift request time T1. The objective in each case is to always carry out the requested downshift with the same high level of shifting quality.

The time period t1 determined at the shift request time T1 is shortened, extended, or is left at the specified value in order to guarantee the desired shifting quality in every case.

Depending on the particular application, it is also possible to carry out the above-described actions for attaining a desired shifting quality, i.e. vary the actuating force of the form-locking shift element F or increase the transmission capability of the friction-locking shift element B to be disengaged, in a suitable manner simultaneously and in a harmonized manner to attain the desired shifting quality.

REFERENCE CHARACTERS 1 transmission device
2 drive shaft
3 output shaft
"1" to "9" gear ratio for forward driving
A to F shift element
n_diff_F rotational speed differential of the form-locking shift element F
n_diff_F("5") rotational speed differential of the form-locking shift element F
n_diff_F("4") synchronous rotational speed of the form-locking shift element F
n_t turbine rotational speed
n_t_syn("5") synchronous rotational speed of the turbine rotational speed
n_t_syn("4") synchronous rotational speed of the turbine rotational speed
p_B actuating pressure of the friction-locking shift element B
p_B1 first intermediate pressure value
p_B2 second intermediate pressure value
p_B3 third intermediate pressure value
p_F_aus counter-pressure
p_F_ein actuating pressure
P1 to P4 planetary gear set
SV shift course
T0 to T9 discrete point of time
t time
t1 time period

The invention claimed is:

1. A method of operating a transmission device (1) comprising a plurality of friction-locking and form-locking shift elements (A to F) for obtaining different gear ratios ("1" to "R"), the method comprising the steps of:
submitting a shift request for engaging a form-locking shift element (F) to a time delay (t1), and the time delay (t1) depending upon an operating state of the form-locking shift element (F) prior to a point in time of engagement (T5, T8; T9);
assigning a differential rotational speed (n_diff_F) to the point in time of engagement (T5, T8; T9), and the differential rotational speed (n_diff_F) between shift element halves of the form-locking shift element (F) being within a differential rotational speed window required for the engagement of the form-locking shift element (F);
ascertaining an initial gradient of either a transmission input speed or an equivalent rotational speed parameter (n_t) at a point of time (T1) of the shift request;
monitoring and comparing an actual gradient of the transmission input speed or the equivalent rotational speed parameter (n_t) with the initial gradient that was ascertained at the point of time (T1) of the shift request;
ascertaining an absolute deviation between the initial gradient and the actual gradient; and
changing a period of the time delay (t1) if the absolute deviation is greater than a threshold value.

2. The method according to claim 1, further comprising the step of shortening the period of the time delay (t1) if the absolute deviation is a positive deviation, the differential rotational speed (n_diff_F) between the shift element halves of the form-locking shift element (F), after expiration of the shortened period of the time delay (t1) lies at least approximately within the differential rotational speed window, the shift request is a downshift request.

3. The method according to claim 1, further comprising the step of extending the period of the time delay (t1) if the absolute deviation is a negative deviation, the differential rotational speed (n_diff_F) between the shift element halves of the form-locking shift element (F), after expiration of the extended period of the time delay (t1) lies at least approximately within the differential rotational speed window, the shift request is a downshift request.

4. The method according to claim 1, further comprising the step of adapting the period of the time delay (t1) between the time (T1) of the shift request for a downshift and the point in time of engagement (T5; T8; T9) of the form-locking shift element (F), depending upon the operating state of the form-locking shift element (F), by varying an actuating force of the form-locking shift element (F).

5. The method according to claim 4, further comprising the step of increasing the actuating force of the form-locking shift element (F) to shorten the period of the time delay (t1).

6. The method according to claim 4, further comprising the step of reducing the actuating force of the form-locking shift element (F) to extend the period of the time delay (t1).

7. The method according to claim 4, further comprising the step of varying the actuating force, required to electrically actuate the form-locking shift element, for changing a control current.

8. The method according to claim 4, further comprising the step of varying the actuating force required, for either pneumatically or hydraulically actuating the form-locking shift element (F), by changing an actuating pressure (p_F_ein) of the form-locking shift element (F).

9. The method according to claim 4, further comprising the step of varying the actuating force required for hydraulically actuating the form-locking shift element (F) by applying a counterpressure (p_F_aus) that counteracts an actuating pressure (p_F_ein) of the form-locking shift element (F).

10. The method according to claim 4, further comprising the step of simultaneously varying the actuating force of the form-locking shift element (F) and increasing a transmission capability of a friction-locking shift element (B) to be disengaged in a harmonized manner.

* * * * *